(12) United States Patent
Yoshimoto et al.

(10) Patent No.: US 8,243,315 B2
(45) Date of Patent: Aug. 14, 2012

(54) PRINTING SYSTEM AND PRINT CONTROL METHOD

(75) Inventors: Tsutomu Yoshimoto, Osaka (JP);
Masanori Matsumoto, Osaka (JP);
Tomoko Toizumi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 234 days.

(21) Appl. No.: 12/806,090

(22) Filed: Aug. 4, 2010

(65) Prior Publication Data

US 2011/0051181 A1  Mar. 3, 2011

(30) Foreign Application Priority Data

Aug. 26, 2009  (JP) .................................. 2009-195239

(51) Int. Cl.
*G06F 3/12* (2006.01)
(52) U.S. Cl. ..................... 358/1.15; 358/1.1; 358/1.13
(58) Field of Classification Search .................... 358/1.1, 358/1.15, 1.13
See application file for complete search history.

(56) References Cited

U.S. PATENT DOCUMENTS

| | | | | |
|---|---|---|---|---|
| 5,455,686 A | * | 10/1995 | Nagano et al. | 358/404 |
| 5,793,935 A | * | 8/1998 | Ko | 358/1.2 |
| 6,633,401 B1 | * | 10/2003 | Kojima | 358/1.15 |
| 2007/0014613 A1 | * | 1/2007 | Ohashi | 400/62 |
| 2008/0309956 A1 | * | 12/2008 | Yano et al. | 358/1.9 |

FOREIGN PATENT DOCUMENTS

| | | |
|---|---|---|
| JP | 2003-248576 A | 9/2003 |
| JP | 2003-260857 A | 9/2003 |
| JP | 2004-330639 | 11/2004 |
| JP | 2005-169649 | 6/2005 |
| JP | 2007-34533 | 2/2007 |
| JP | 2007-078832 A | 3/2007 |
| JP | 2008-022423 A | 1/2008 |

* cited by examiner

*Primary Examiner* — King Poon
*Assistant Examiner* — Iriana Cruz
(74) *Attorney, Agent, or Firm* — George W. Neuner; Edwards Wildman Palmer LLP

(57) ABSTRACT

A printing system comprises a printer and an information processor, which includes a control unit. The control unit generates a print data file, which includes a resource saving flag and mode information. This information represents either a printing mode or a document filing mode, in which the printer operates. The control unit determines whether one or more specified resource saving functions of the printer are selected for the print data file in a main setting window. If so, the control unit turns on the flag and outputs the print data file as a first print data file to the printer. If not, the control unit turns off the flag and outputs the print data file as a second print data file to the printer. If a user is specified for the second print data file, the control unit outputs the file to the printer, with the mode information representing the document filing mode.

10 Claims, 11 Drawing Sheets

FIG.8

| File Name | Resource Saving Flag |
|---|---|
| A.doc | on |
| B.doc | on |
| C.doc | on |
| D.doc | off |
| E.doc | off |

PRINTING SYSTEM AND PRINT CONTROL METHOD

CROSS REFERENCE

This Nonprovisional application claims priority under 35 U.S.C. §119(a) on Patent Application No. 2009-195239 filed in Japan on Aug. 26, 2009, the entire contents of which are hereby incorporated by reference.

BACKGROUND OF THE INVENTION

The present invention relates to a printing system and a print control method for controlling the operation of a printer.

In recent years, from the perspective of terrestrial environment protection, there have been strong demands for resource savings in printing paper, colorant, and other printing materials in the field of office work including the printing by printers. Some functions of printers can contribute to resource savings by reducing the number of sheets of printing paper used by the printers. One of the functions is a double-side printing function to print images on both sides of a sheet. Another of the functions is an aggregate printing function to print two or more shrunk images on one sheet.

In general, a color printer has a monochromatic printing function to print color images as monochromatic images. By printing less important color images by means of the monochromatic printing function, it is possible to reduce consumption of color ink, color toner or other colorant, thus contributing to resource savings.

A resource-saving processing function is to reduce the medium consumption (consumption of printing paper or toner) necessary for printing.

For example, each of JP-2008-22423-A, JP-2003-248576-A, and Japanese Patent No. 3,899,962 discloses an image forming apparatus or a peripheral device management system that makes it easy to set resource saving functions, which can contribute to resource savings. The resource saving functions may be a double-side printing function, an aggregate printing function, a monochromatic printing function, and a low-quality printing function.

The image forming apparatus disclosed by JP-2008-22423-A makes it possible to register in it a combination of printing functions as associated with a button on its display. The printing functions make it possible to reduce image forming costs, which are calculated based on the unit costs of each type of printing paper and each type of image formation. A user can set the combination of printing functions by clicking on the single button without setting them individually.

The peripheral device management system disclosed by JP-2003-248576-A calculates the reduction in the number of sheets of printing paper and/or the ratio of reduction in the number of sheets of printing paper per user and/or per device based on the difference between the actual number of sheets on which printing has been done (for example, double-side printing on one sheet counts as one sheet) and the number of sheets of printing paper as counted on the assumption that one-side printing has been done on each of the sheets (for example, double-side printing on one sheet counts as two sheets).

The image forming apparatus disclosed by Japanese Patent No. 3,899,962 does printing immediately if the actual printing function selected by a user is more effective in resource saving than a specified printing function. This apparatus prompts the user to reselect another printing function if the actual printing function is not more effective in resource saving than the specified printing function.

On the one hand, in order to meet demands for resource savings, it is necessary to make resource saving functions used positively. On the other hand, there may be cases where one or more resource saving functions cannot be used according to the importance or the like of image data files to be printed.

Every time the apparatus disclosed by JP-2008-22423-A or the system disclosed by JP-2003-248576-A does printing, the user needs to decide whether to use each of the resource saving functions. Therefore, the user may not use the resource saving functions.

The apparatus disclosed by Japanese Patent No. 3,899,962 forces the user to select a resource saving function, so that the user cannot select another function, which may be a one-side printing function or a color printing function.

An object of the present invention is to provide a printing system and a print control method that make a user select one or more resource saving functions of the printer of the system by preference.

Another object of the invention is to provide a printing system and a print control method that enable a user to select no resource saving function of the printer as occasion arises.

SUMMARY OF THE INVENTION

A printing system according to an aspect of the present invention comprises an information processor and a printer that are connected together.

The information processor includes a first control unit for generating a print data file based on an image data file.

The printer includes a second control unit for print-processing the print data file. The printer has a resource saving function for reducing the amount of printing media consumed by the printer.

The print data file includes a flag indicating whether the resource saving function is requested to be activated for the print data file.

The information processor further includes a first inputting means for inputting initiation of the print-processing of the print data file.

The information processor further includes a first determining means for determining whether the resource saving function is requested to be activated for the print data file. If the function is requested to be activated for the print data file, the first control unit turns on the flag. If the function is not requested to be activated for the print data file, this control unit turns off the flag.

The first control unit includes a transmitting means for transmitting the print data file to the printer.

When the first inputting means detects the initiation of the print-processing, the transmitting means transmits the print data file as a first print data file to the printer if the flag is turned on. When the first inputting means detects the initiation of the print-processing, the transmitting means transmits the print data file as a second print data file to the printer if the flag is turned off.

The second control unit includes a print-processing means. If the second control unit receives the first print data file from the transmitting means, the print-processing means print-processes the received file. The printer further includes a storing means. If the second control unit receives the second print data file from the transmitting means, the print-processing means stores the received file temporarily in the storing means without print-processing the received file.

The print data file may further include mode information. The information processor may further include a second determining means for determining whether a user is specified for the second print data file. If a user is specified for the second print data file, the transmitting means transmits this file to the printer, with the mode information representing a mode in which the second control unit print-processes the print data file.

The transmitting means may include an informing means for informing a user that the second print data file is a print data file for which the resource saving function is not requested to be activated.

A printing system according to another aspect of the present invention comprises an information processor and a printer that are connected together.

The information processor includes a first control unit for generating print data files each based on an image data file.

The printer includes a second control unit for print-processing the print data files. The printer has a resource saving function for reducing the amount of printing media consumed by the printer.

Each of the print data files includes a flag indicating whether the resource saving function is requested to be activated for the associated file.

The information processor further includes a first inputting means for inputting initiation of the print-processing of the print data files.

The information processor further includes a first determining means for determining whether the resource saving function is requested to be activated for each of the print data files. If the function is requested to be activated for any one of the print data files, the first control unit turns on the associated flag. If the function is not requested to be activated for any one of these files, this control unit turns off the associated flag.

The first control unit includes a transmitting means for transmitting the print data files to the printer. Every time the first inputting means detects the initiation of the print-processing of one of the print data files, the transmitting means transmits this file as a first print data file to the printer if the associated flag is turned on. Every time the first inputting means detects the initiation of the print-processing of one of the print data files, the transmitting means transmits this file as a second print data file to the printer if the associated flag is turned off.

The second control unit includes a print-processing means. If the second control unit receives the first print data file from the transmitting means, the print-processing means print-processes the received file. The printer further includes a storing means. If the second control unit receives the second print data file from the transmitting means, the print-processing means stores it temporarily in the storing means without print-processing it.

The printer further includes a displaying means for selectably displaying the second print data files stored temporarily in the storing means. The printer further includes a second inputting means for inputting initiation of the print-processing of the displayed files. Every time the second inputting means detects the initiation of the print-processing of one of the displayed files, the second control unit print-processes it.

The second control unit may include a print queue and be able to store the first and second print data files in order of printing priority in the queue. Every time the second control unit print-processes one of the first print data files, this unit may store it before the second print data files in the queue so that the first print data files can be print-processed earlier than the second print data files.

In this invention, if no specified resource saving function is requested for a print data file, the second control unit stores the file temporarily in the printer memory unit without print-processing it. In order to print the stored file, the user needs to do complicated operations at the printer. As a result, the user is liable to avoid the complicated operations by selecting one or more specified resource saving functions before instructing the information processor to start print-processing the print data file. Thus, the printer is apt to perform the resource saving function.

BRIEF DESCRIPTION OF THE DRAWINGS

FIG. 8 is a table of the print queue of the printer.

DETAILED DESCRIPTION OF THE INVENTION

An embodiment of the present invention will be described below with reference to the accompanying drawings.

Figure 1:
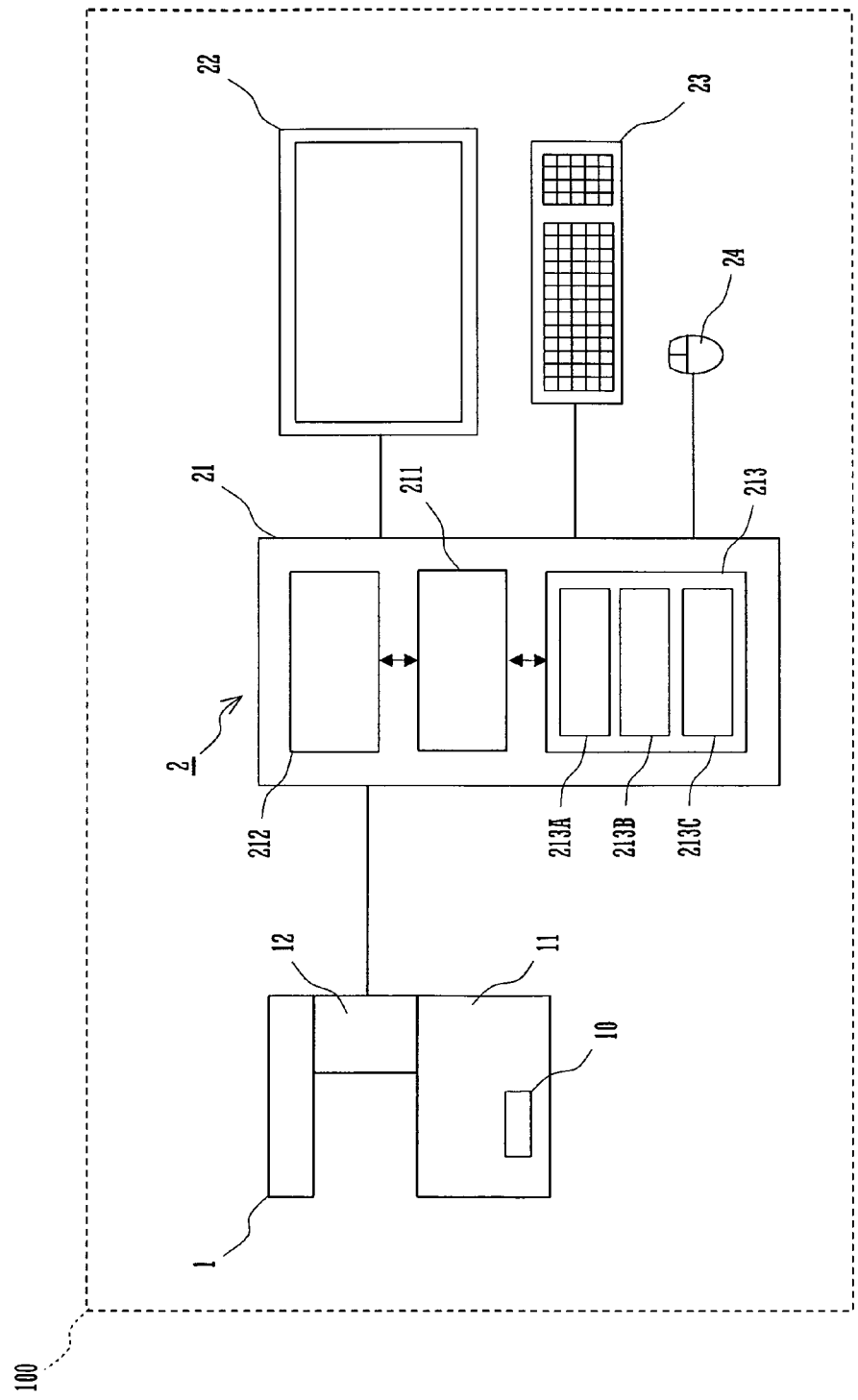
FIG. 1 is a block diagram of a printing system embodying the present invention, the system consisting of a printer and an information processor.

With reference to FIG. 1, a printing system 100 according to the embodiment consists of a printer 1 and an information processor 2 that are connected together directly or via a network.

The printer 1 includes a control unit 10, a paper feeding unit 11, and an image forming unit 12. The printer control unit 10 controls the other units 11 and 12. The paper feeding unit 11 feeds the image forming unit 12 with sheets of printing paper or other recording media made of OHP film or a material other than paper. The image forming unit 12 does printing based on print data, forming color or monochromatic images on the sheets. The printer 1 may be a multi-function printer for electrophotographic printing. An electrophotographic printer, an ink jet printer and other printers might be connected to the information processor 2.

The information processor 2 may be a personal computer and includes a main body 21, a display 22, a keyboard 23, and a mouse 24. The main body 21 includes a control unit 211, which has a memory unit 212 and a program storage unit 213.

The processor control unit 211 is connected to the display 22, keyboard 23, and mouse 24, and also connected to the printer 1 directly or via a network.

The program storage unit 213 has an operating system (not shown), an application program 213A for data file generation, a printer driver 213B, and a print control program 213C that are installed in it. The processor control unit 211 controls the operation of the printer 1 with the printer driver 213B during printing. The print control program 213C embodies part of the present invention.

The processor control unit 211 operates according to the programs in the program storage unit 213. While the application program 213A is active, the control unit 211 generates an image data file, which includes document data, based on the data entered by means of the keyboard 23 and mouse 24. The control unit 211 converts the generated image data file into a display data file, displays the display data file on the display 22, and stores the image data file in the memory unit 212.

While the printer driver 213B is active, the processor control unit 211 generates a print data file from the image data file in the memory unit 212 based on the data entered by means of the keyboard 23 and mouse 24. The control unit 211 outputs the generated print data file to the printer 1 via an interface (not shown).

Figure 2:
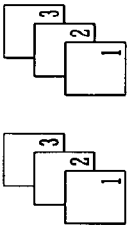
FIG. 2 is an illustration of the printing window displayed on the information processor according to the printer driver installed in the processor.

If a user makes a print request by means of the keyboard 23 or mouse 24 while the application program 213A is active, the processor control unit 211 activates the printer driver 213B, so that a printing window 31 as exemplified by FIG. 2 appears on the display 22.

With reference to FIG. 2, a printer setting area 311, a print range area 312, an area 313 for the number of copies, a scaling area 314, and a print start button 315 are laid out in the printing window 31.

In the print range area 312, the user can specify the necessary printing range of the image data file generated with the application program 213A.

In the area 313 for the number of copies, the user can set the necessary number of copies of the specified range of the image data file.

The scaling area 314 shows settings for or computation results about the number of pages per sheet and sheet size as information necessary for the decision of the scale factor at which an image is to be formed on sheets of printing paper.

The name of the printer 1 is shown in the printer setting area 311. If the information processor 2 were connected to two or more printers, the user could select one of them in the area 311. In the printer setting area 311, a property button 316 is provided for the confirmation of settings. If the user clicks on the property button 316, a main setting window 32 as exemplified by FIG. 3 appears on the display 22.

Figure 3:
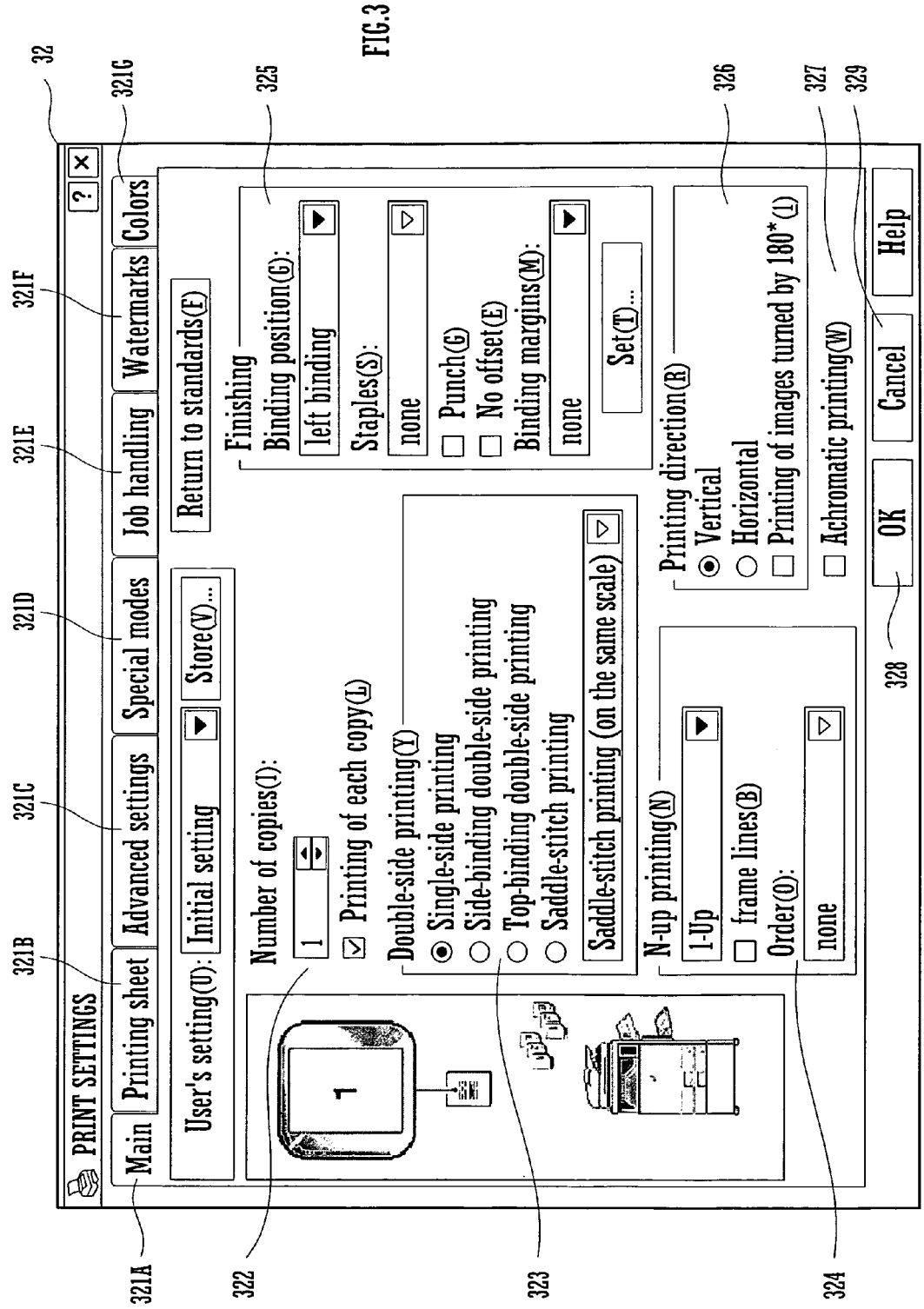
FIG. 3 is an illustration of the main setting window displayed on the information processor according to the printer driver.

With reference to FIG. 3, the main setting window 32 has pages 321A-321G, each of which shows what functions of the printer 1 are selected and what settings are made for the functions of the printer, and on which selections and settings can be changed. For example, the main page 321A has areas 322-327, where the user can change the selections or settings for the number of copies, double-side printing functions, aggregate printing functions, finishing, printing direction and a monochromatic printing function respectively.

The double-side printing functions are to print images on both sides of a sheet. The aggregate printing functions may be 2-up and 4-up printing functions. The 2-up printing function is to print images for two pages on one side of a sheet. The 4-up printing function is to print images for four pages on one side of a sheet. The monochromatic printing function is to print color images as monochromatic images.

The double-side, monochromatic and aggregate printing functions are resource saving functions, which can contribute to savings of resources such as printing paper and ink. The resource saving functions are to reduce the amounts of media such as printing paper, ink and toner consumed for printing.

In the main setting window 32, a user and one or more of the resource saving functions can be specified for the print data file. If the specified function functions are selected for the print data file, the printer 1 immediately prints the file. The printer 1 has a filing folder (not shown), which is a memory.

If the specified function or functions are not selected for the print data file, but if a user is specified for the file, it can be printed immediately. If the specified function or functions are not selected for the print data file, and if no user is specified for the file, the printer control unit 10 stores it temporarily in the filing folder.

Alternatively, whether a user is specified or not for the print data file, the file might, if the specified function or functions are selected for it, be printed immediately by the printer 1, and might, if the specified function or functions are not selected for the file, be stored temporarily in the filing folder.

The main setting window 32 also has a decision button 328 and a cancel button 329 as selection/setting completion buttons, on which the user clicks when the user has confirmed the selections and settings in this window or changed one or more of them. The user can click on the decision button 328 to decide the changed selection/s or setting/s. The user can click on the cancel button 329 to cancel the changed selection/s or setting/s.

The printing procedures that the printing system 100 performs will be described with reference to FIGS. 4-8. The printing procedure that the processor control unit 211 executes will be described below with reference to FIGS. 4-6.

Figure 4:
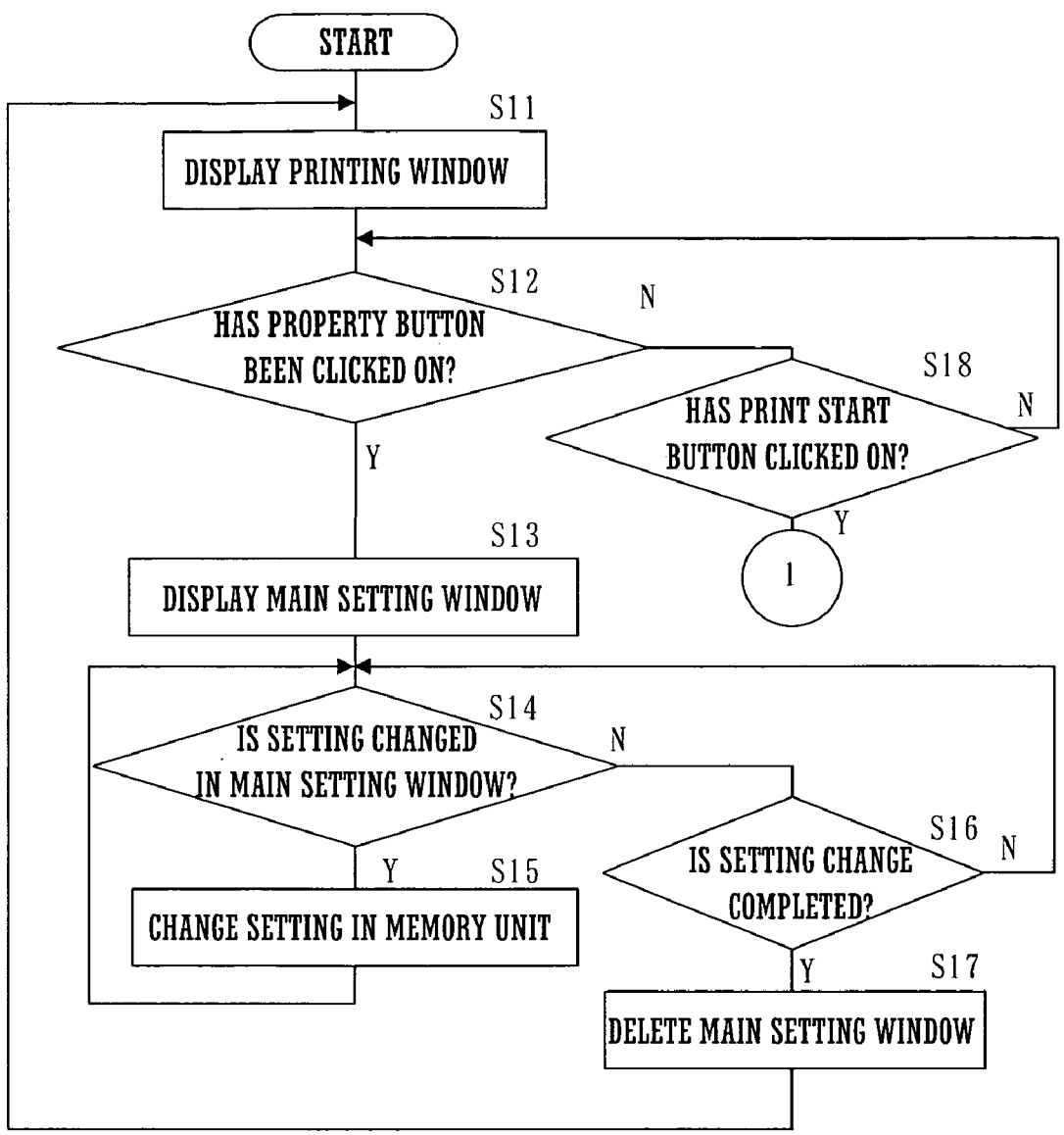
FIG. 4 is a flowchart of the procedure that the control unit of the information processor executes according to the printer driver.

With reference to FIG. 4, if a user makes a print request for an image data file in the memory unit 212 of the information processor 2 while the application program 213A is active, the processor control unit 211 displays the printing window 31 (FIG. 2) at the front of the display 22 at S11 and waits for the user's further operation. If the user makes a setting confirmation request at S12 by clicking on the property button 316 in the printing window 31, the control unit 211 displays the main setting window 32 (FIG. 3) at the front of the display 22 at S13 and waits for the user to change one of the selections and settings in this window.

If the user changes one of the selections and settings in the main setting window 32 at S14, the processor control unit 211 changes the appropriate selection or setting in the memory unit 212 at S15. If the user clicks on one of the decision button 328 and cancel button 329 as the selection/setting completion buttons in the main setting window 32 at S16, the control unit 211 deletes the main setting window 32 from the display 22 at S17. Then, the printing procedure returns to S11, where the printing window 31 appears at the front of the display 22.

If the user clicks on the print start button 315 in the printing window 31 at S18 while this window is displayed on the display 22, the control unit 211 activates the print control program 213O in the program storage unit 213.

Figure 5:
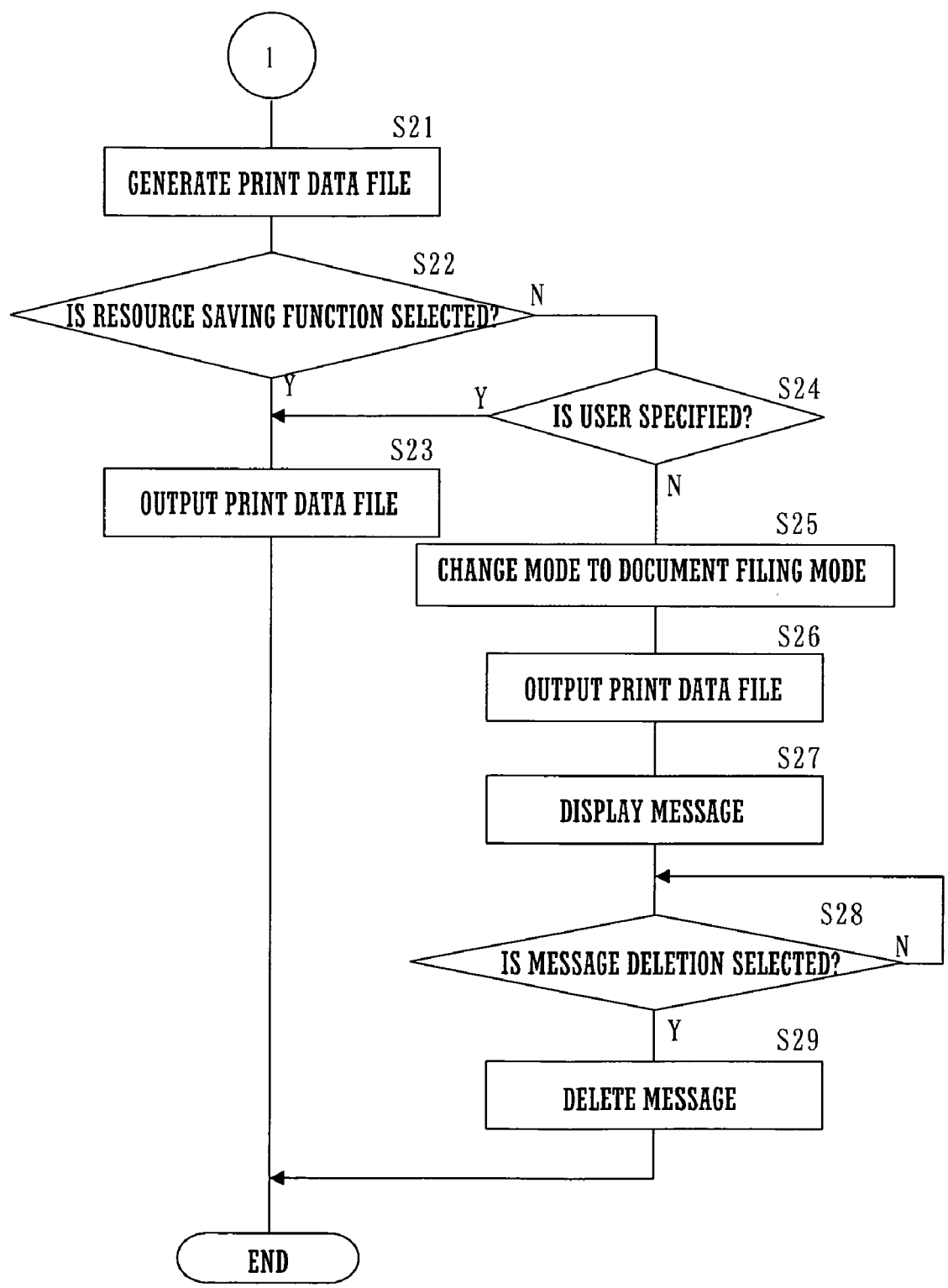
FIG. 5 is a flowchart of the procedure that the control unit of the information processor executes according to the print control program installed in the processor.

With reference to FIG. 5, when the print control program 213C is activated, the control unit 211 converts the image data file in the memory unit 212 into a print data file at S21 based on the selections and settings made in the main setting window 32. The print data file includes mode information, printer setting information, and a resource saving flag.

The mode information represents either a printing mode or a document filing mode, in which the printer 1 operates. In the printing mode, which is set by default, the printer 1 does printing based on the printer setting information on the print data file received by the printer. In the document filing mode, the printer 1 stores temporarily in the filing folder the print data file received by the printer 1. The printer 1 can print the temporarily stored file if the user operates the printer. If the printer 1 does not print the temporarily stored file for a specified period, which may be one day or week, the file will be deleted automatically.

The printer setting information represents one or more of the selections and settings made in the main setting window 32 for the double-side printing function, monochromatic printing function and other functions of the printer 1. For example, the double-side printing function involves turning a sheet of printing paper over and feeding the turned sheet again in the printer 1. If the double-side printing function is selected, it is set in the printer setting information.

The resource saving flag indicates whether the specified function or functions are selected for the associated print data file. If the specified function or functions are selected for the file, the flag is turned on. If the specified function or functions are not selected for the file, the flag is turned off.

At S22, the processor control unit 211 determines whether the specified function or functions are selected in the main setting window 32 for the print data file. If so, the control unit 211 turns on the resource saving flag of the print data file and outputs this file as a first print data file to the printer 1 at S23. If not, the control unit 211 turns off the resource saving flag for the print data file and designates this file as a second print data file.

At S24, the processor control unit 211 determines whether the second print data file belongs to a specified user. If so, the control unit 211 immediately outputs the second print data file to the printer 1 at S23. If not, the control unit 211 changes the mode information on the second print data file to the document filing mode at S25 and then outputs this file to the printer 1 at S26.

Figure 6:
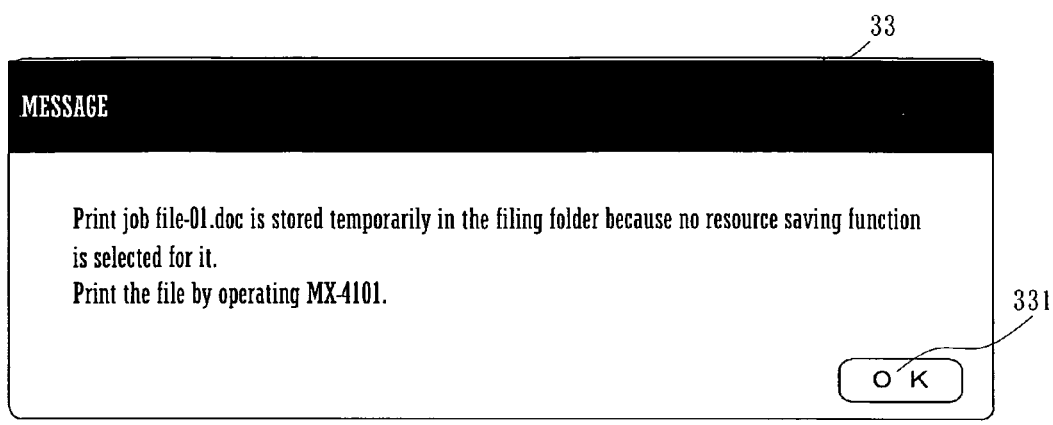
FIG. 6 shows a pop-up displayed by the control unit of the information processor, the pop-up informing the user that a print data file is stored in the filing folder of the printer.

At S27, the processor control unit 211 displays on the display 22 a pop-up 33 as shown by FIG. 6. The pop-up 33 may have a message saying "The print job file-01.doc is stored temporarily in the filing folder because no resource saving function is selected for it. Print the file by operating MX-4101". If the user clicks on the OK button 331 in the pop-up 33 at S28, the control unit 211 removes the pop-up 33 at S29.

Thus, the information processor 2 transmits immediately to the printer 1 the first print data file, for which the specified function or functions are selected. If the second print data file, for which the specified function or functions are not selected, does not belong to a specified user, the information processor 2 changes the mode information on this file to the document filing mode and then output the file to the printer 1. If the second print data file belongs to a specified user, the information processor 2 transmits this file immediately to the printer 1.

The printing procedure that the printer control unit 10 executes will be described below with reference to FIGS. 7 and 8. The printer control unit 10 has a print queue as shown by FIG. 8.

Figure 7:
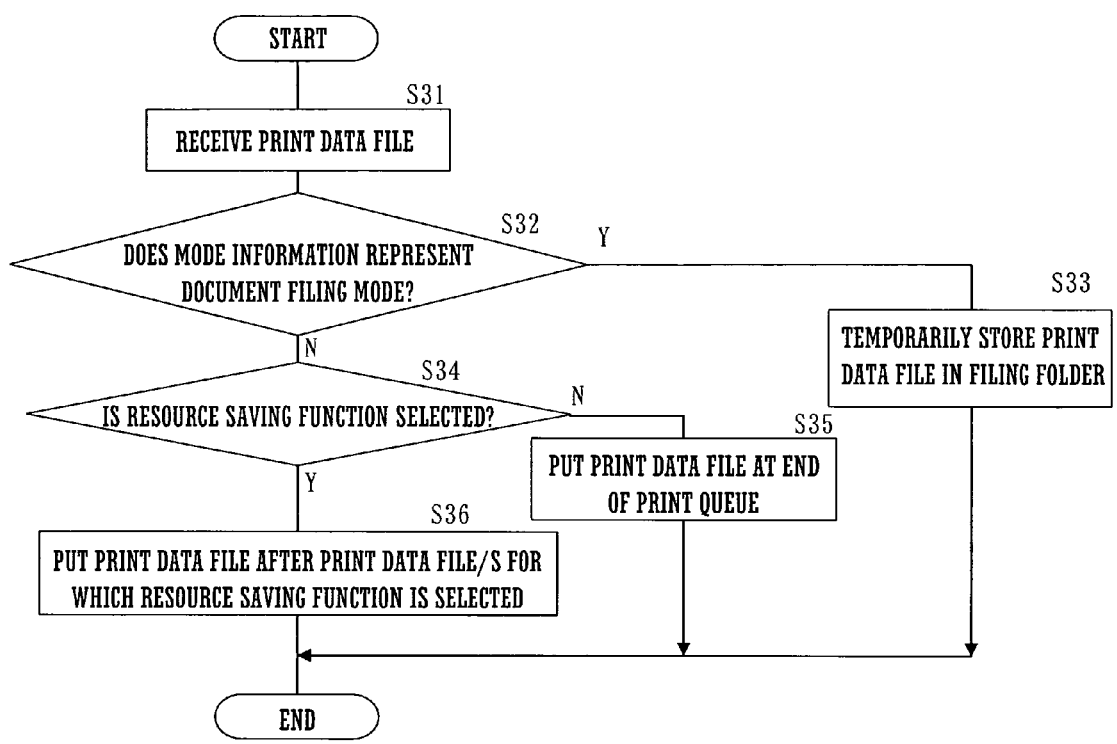
FIG. 7 is a flowchart of the procedure that the control unit of the printer executes.

With reference to FIG. 7, when the printer control unit 10 receives a print data file from the information processor 2 at S31, this unit determines at S32 whether the mode information on this file represents the document filing mode. If so, the control unit 10 stores the print data file as a second print data file temporarily in the filing folder at S33 without making the printer 1 print it.

If the mode information represents the printing mode at S32, the printer control unit 10 determines at S34, with reference to the resource saving flag of the print data file received by the printer 1, whether the specified function or functions are selected for this file. If not (the flag is off) at S34, the control unit 10 adds the print data file as a second print data file to the end of the print queue (FIG. 8) at S35. Specifically, at S35, the control unit 10 puts the second print data file after the second print data file E.doc in the print queue.

The print queue is a memory, where the printer control unit 10 stores two or more print data files in order of printing priority. With reference to FIG. 8, the first print data file A.doc and the second print data file E.doc in the print queue are to be printed first and last respectively. The control unit 10 makes the printer 1 print each print data file based on the associated printer setting information.

If the specified function or functions are selected (the resource saving flag is on) for the print data file received by the printer 1, the printer control unit 10 identifies this file as a first print data file. At S36, the printer control unit 10 puts this first print data file between the first and second print data files (between C.doc and D.doc) in the print queue.

Thus, the printer 1 prints the first print data files, for each of which the specified function or functions are selected, by priority over the second print data files, for which the specified function or functions are not selected. Specifically, by lowering the printing priority of the second print data files, for which the specified function or functions are not selected, the printing system 100 prompts the user to select one or more of the resource saving functions.

The procedure for printing a second print data file stored temporarily in the filing folder will be described below with reference to FIGS. 9-11, which show the console panel of the printer 1.

Figure 9:
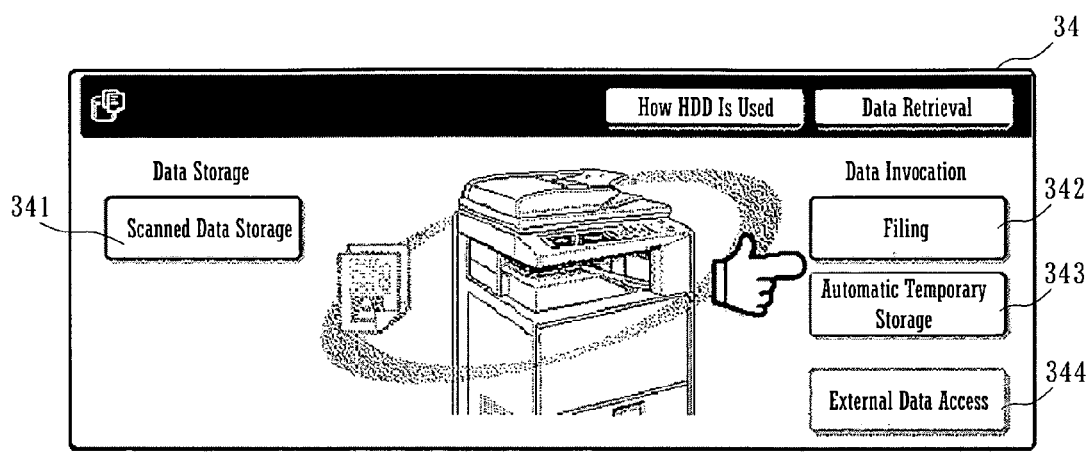
FIGS. 9-11 are illustrations of different windows displayed on the console panel of the printer.

With reference to FIG. 9, the printer control unit 10 displays an execution window 34 on the console panel according to the user's operation on the panel. The execution window 34 has a scanned data storage button 341, a filing folder button 342, an automatic temporary storage folder button 343, etc. The user can touch the storage button 341 to store scanned data files. The user can touch the filing folder button 342 to invoke the print data files stored in the filing folder.

Figure 10:
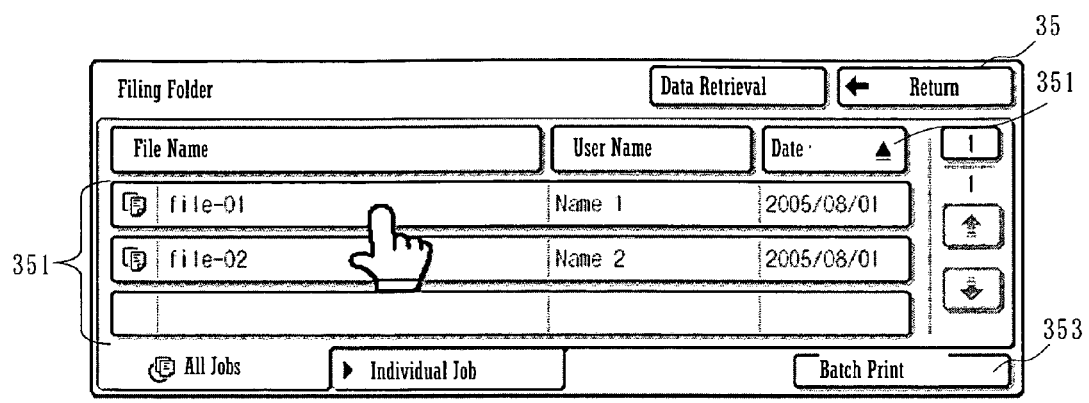

If the user touches the filing folder button 342, the printer control unit 10 displays on the console panel a list window 35 as shown by FIG. 10, where the print data files in the filing folder are listed. The window 35 has a date sort button 351, file selection buttons 352, a batch print button 353, etc. The user can touch the date sort button 351 to sort the print data files by date. The user can touch one of the file selection buttons 352 to select one of the print data files. The user can touch the batch print button 353 to print all of these files by means of batch processing.

Figure 11:
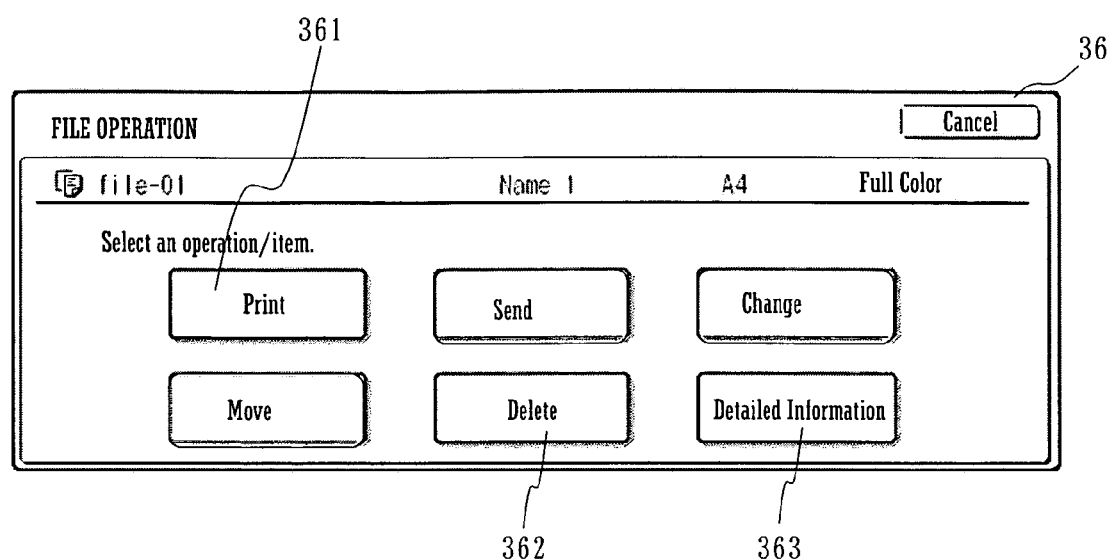

If the user selects the file selection button 352 for the second print data file 01.doc, the printer control unit 10 displays on the console panel a file operation window 36 as shown by FIG. 11. The file operation window 36 has a print button 361, a delete button 362, a detail button 363, etc. The user can touch the print button 361 to print the selected file. The user can touch the delete button 362 to delete the selected file. The user can touch the detail button 363 to display detailed information on the selected file.

If the user touches the print button 361, the printer control unit 10 adds to the end of the print queue the second print data file 01.doc, for which the specified function or functions are not selected.

Thus, the user needs to operate the printer 1 in order to print the second print data file 01.doc, which is stored temporarily in the filing folder. As a result, the printing system 100 can prompt the user to select one or more of the resource saving functions in the main setting window 32 rather than do complicated operations at the printer 1.

In the embodiment, if a print data file of a specified user is a second print data file, for which the specified function or functions are not selected, the file is added to the end of the print queue of the printer 1. Alternatively, specified users might be ranked, and the second print data files of high-rank specified users might be added to the print queue equally in priority to the first print data files, for each of which the specified function or functions are selected.

In the embodiment, the pop-up 33 informs the user that the specified function or functions are not selected. Alternatively, the user might be so informed vocally or with a warning sound.

If the information processor 2 so converted an image data file into a print data file that the printer 1 performs one or more of the resource saving functions, the processor 2 might output to the printer 1 the image data file or the print data file with a command to perform one or more of the selected functions.

In the embodiment, the information processor 2 generates a print data file from an image data file. Alternatively, the printer 1 might generate a print data file from an image data file. In this case, the information processor 2 might transmit to the printer 1 the selections and settings in the main setting window 32 with the image data file. Then, the printer 1 might determine whether the specified function or functions are selected for the transmitted file.

In the embodiment, the printer 1 immediately prints a print data file for which the specified function or functions are selected. The printer 1 might also immediately print a print data file for which a function or functions more effective in resource saving than the specified function/s are selected. Specifically, the specified functions may be a double-side printing function, the 2-up printing function, and the monochromatic printing function. In this case, the printer 1 might immediately print a print data file for which the specified functions are selected and a print data file for which the double-side printing function, the 4-up printing function, and the monochromatic printing function are selected.

In the embodiment, a user and one or more of the resource saving functions can be specified in the main setting window 32. A user and one or more of the resource saving functions could be specified in another window. For example, after a print request is made, a specifying window might be displayed before the printing window 31 is displayed. In the specifying window, a user and one or more of the resource saving functions could be specified. The information processor 2 might deliver information on the specified user and function/s to another information processor. Alternatively, a user and one or more of the resource saving functions could be specified in the printer 1, and information on the specified user and function/s might be delivered to the information processor 2.

The resource saving functions might be a back-side printing function and a low-quality printing function. The back-side printing function is to do printing on the blank side of a printed sheet.

In the embodiment, after the processor control unit 211 determines whether the specified resource saving function or functions are selected for a print data file, this unit determines whether a user is specified for the file. Alternatively, after the control unit 211 determines whether a user is specified for a print data file, this unit might determine whether one or more of the resource saving functions are selected for the file.

The print control program 213C might be part of the printer driver 212B. If two or more printer drivers were installed in the program storage unit 213 of the information processor 2, any one of them could cooperate with the print control program 213C.

It is not essential that the print control program 213C be installed in the information processor 2. If the printer 1 were fitted with a display, the print control program 213C might be installed in the printer. The print control program 213C might be installed in a print server on a network.

The print control program 213C might be applied to a printing system including a monochromatic printer.

The present invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A printing system comprising:
an information processor including a first control unit for generating a print data file based on an image data file; and
a printer connected to the information processor;
the printer including a second control unit for print-processing the print data file;
the printer having a resource saving function for reducing the amount of printing media consumed by the printer;
wherein the print data file includes a flag indicating whether the resource saving function is requested to be activated for the print data file;
the information processor further including a first inputting means for inputting initiation of the print-processing of the print data file;
the information processor further including a first determining means for determining whether the resource saving function is requested to be activated for the print data file;
wherein, if the resource saving function is requested to be activated for the print data file, the first control unit turns on the flag; and
wherein, if the resource saving function is not requested to be activated for the print data file, the first control unit turns off the flag;
the first control unit including a transmitting means for transmitting the print data file to the printer;
wherein, when the first inputting means detects the initiation of the print-processing, the transmitting means transmits the print data file as a first print data file to the printer if the flag is turned on;
wherein, when the first inputting means detects the initiation of the print-processing, the transmitting means transmits the print data file as a second print data file to the printer if the flag is turned off;
wherein the second control unit includes a print-processing means; and
wherein, if the second control unit receives the first print data file from the transmitting means, the print-processing means print-processes the received file;
the printer further including a storing means;
wherein, if the second control unit receives the second print data file from the transmitting means, the print-processing means stores the received file temporarily in the storing means without print-processing the received file.

2. A printing system comprising:
an information processor including a control unit for generating print data files each based on an image data file; and
a printer connected to the information processor;
the printer including a second control unit for print-processing the print data files;
the printer having a resource saving function for reducing the amount of printing media consumed by the printer;
wherein each of the print data files includes a flag indicating whether the resource saving function is requested to be activated for the associated file;
the information processor further including a first inputting means for inputting initiation of the print-processing of the print data files;

the information processor further including a first determining means for determining whether the resource saving function is requested to be activated for each of the print data files;

wherein, if the resource saving function is requested to be activated for any one of the print data files, the first control unit turns on the associated flag; and wherein, if the resource saving function is not requested to be activated for any one of the print data files, the first control unit turns off the associated flag;

the first control unit including a transmitting means for transmitting the print data files to the printer;

wherein, every time the first inputting means detects the initiation of the print-processing of one of the print data files, the transmitting means transmits said one of the print data files as a first print data file to the printer if the associated flag is turned on;

wherein, every time the first inputting means detects the initiation of the print-processing of one of the print data files, the transmitting means transmits said one of the print data files as a second print data file to the printer if the associated flag is turned off;

wherein the second control unit includes a print-processing means; and wherein, if the second control unit receives the first print data file from the transmitting means, the print-processing means print-processes the received file; and the printer further including a storing means;

wherein, if the second control unit receives the second print data file from the transmitting means, the print-processing means stores the received file temporarily in the storing means without print-processing the received file;

the printer further including a displaying means for selectably displaying the second print data files stored temporarily in the storing means;

the printer further including a second inputting means for inputting initiation of the print-processing of the displayed second print data files;

wherein, every time the second inputting means detects the initiation of the print-processing of one of the displayed second print data files, the second control unit print-processes said one of the displayed files.

3. The printing system as claimed in claim 1:

wherein the print data file further includes mode information;

wherein the information processor further includes a second determining means for determining whether a user is specified for the second print data file; and wherein, if a user is specified for the second print data file, the transmitting means transmits the second print data file to the printer, with the mode information representing a mode in which the second control unit print-processes the print data file.

4. The printing system as claimed in claim 2, wherein the second control unit includes a print queue and can store the first and second print data files in order of printing priority in the queue, and wherein, every time the second control unit print-processes one of the first print data files, the second control unit stores said one of the first print data files before the second print data files in the queue so that the first print data files can be print-processed earlier than the second print data files.

5. The printing system as claimed in claim 1, wherein the transmitting means includes an informing means for informing a user that the second print data file is a print data file for which the resource saving function is not requested to be activated.

6. A print control method for use with an information processor and a printer, the processor including a first control unit for generating a print data file based on an image data file, the printer being connected to the processor, the printer including a second control unit and a storing means, the printer having a resource saving function for reducing the amount of printing media consumed by the printer, the print data file including a flag indicating whether the function is requested to be activated for the print data file, the method comprising:

a determining step for determining in the information processor whether the resource saving function is requested to be activated for the print data file;

a first inputting step for inputting initiation of the print-processing of the print data file;

a transmitting step for transmitting in the first control unit the print data file to the printer when the first inputting means detects the initiation of the print-processing, the transmitted file being a first print data file with the flag turned on if the resource saving function is requested to be activated for the transmitted file, the transmitted file being a second print data file with the flag turned off if the function is not requested to be activated for the transmitted file; and a print-processing step for print-processing the first print data file in the second control unit if the second control unit receives the transmitted first print data file, or for storing the second print data file temporarily in the storing means of the printer without print-processing the second print data file if the second control unit receives the transmitted second print data file.

7. A print control method for use with an information processor and a printer, the processor including a control unit for generating print data files each based on an image data file, the printer being connected to the processor, the printer including a second control unit and a storing means, the printer having a resource saving function for reducing the amount of printing media consumed by the printer, the print data files each including a flag indicating whether the function is requested to be activated for the associated file, the method comprising:

a determining step for determining in the information processor whether the resource saving function is requested to be activated for each of the print data files;

a first inputting step for inputting initiation of the print-processing of the print data files;

a transmitting step for transmitting in the first control unit one of the print data files to the printer every time the first inputting means detects the initiation of the print-processing of one of the print data files at the first inputting step, the transmitted file being a first print data file with the associated flag turned on if the resource saving function is requested to be activated for the transmitted file, the transmitted file being a second print data file with the associated flag turned off if the function is not requested to be activated for the transmitted file;

a print-processing step for print-processing the first print data file in the second control unit if the second control unit receives the transmitted first print data file, or for storing the second print data file temporarily in the storing means of the printer without print-processing the second print data file if the second control unit receives the transmitted second print data file;

a displaying step for selectably displaying at the printer the second print data files stored temporarily in the storing means; and a second inputting step for inputting initiation of the print-processing of the displayed second print data files;

wherein, in the print-processing step, every time the initiation of the print-processing of one of the displayed second print data files is detected, the second control unit print-processes said one of the displayed files.

8. The print control method as claimed in claim 6, wherein the print data file further includes mode information, the method further comprising:

a second determining step for determining in the information processor whether a user is specified for the second print data file;

the transmitting step being adapted to transmit the second print data file to the printer, with the mode information representing a mode in which the second control unit print-processes the second print data file, if a user is specified for the second print data file.

9. The print control method as claimed in claim 7, wherein the second control unit includes a print queue and can store the first and second print data files in order of printing priority in the queue;

the print-processing step being adapted to print-process the first print data files by storing the first print data files before the second print data files in the print queue so that the first print data files can be print-processed earlier than the second print data files.

10. The print control method as claimed in claim 6, wherein the transmitting step includes an informing step for informing a user that the second print data file is a print data file for which the resource saving function is not requested to be activated.

* * * * *